(12) United States Patent
Nagasaka et al.

(10) Patent No.: US 10,237,493 B2
(45) Date of Patent: Mar. 19, 2019

(54) CAMERA CONFIGURATION METHOD AND APPARATUS

(71) Applicant: SHENZHEN REALIS MULTIMEDIA TECHNOLOGY CO., LTD, Shenzhen (CN)

(72) Inventors: Tomohiro Nagasaka, Shenzhen (CN); Jin Yao, Shenzhen (CN)

(73) Assignee: SHENZHEN REALIS MULTIMEDIA TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/561,121

(22) PCT Filed: Aug. 9, 2016

(86) PCT No.: PCT/CN2016/094125
§ 371 (c)(1),
(2) Date: Sep. 25, 2017

(87) PCT Pub. No.: WO2018/027533
PCT Pub. Date: Feb. 15, 2018

(65) Prior Publication Data
US 2018/0255248 A1  Sep. 6, 2018

(51) Int. Cl.
*H04N 5/247* (2006.01)
*H04N 5/232* (2006.01)
*H04N 17/00* (2006.01)

(52) U.S. Cl.
CPC ......... *H04N 5/247* (2013.01); *H04N 5/23216* (2013.01); *H04N 17/002* (2013.01)

(58) Field of Classification Search
CPC ..................................................... H04N 5/247

(Continued)

(56) References Cited

U.S. PATENT DOCUMENTS

2014/0055621 A1* 2/2014 Shirani .................... H04N 7/18
348/159

FOREIGN PATENT DOCUMENTS

| CN | 101251925 A | 8/2008 |
| CN | 102300051 A | 12/2011 |

(Continued)

OTHER PUBLICATIONS

The World Intellectual Property Organization (WIPO) International Search Report for PCT/CN2016/094125 dated Apr. 27, 2017 6 Pages.

*Primary Examiner* — Joel W Fosselman
(74) *Attorney, Agent, or Firm* — Anova Law Group, PLLC

(57) ABSTRACT

A camera configuration method solving the problem of lacking effective way to properly configure motion capture cameras in the conventional technologies, comprising: in a preset view region, determining a preset number of camera configuration modes according to camera parameters set by a user; setting a preset number of test points in the preset view region; calculating a number of visible cameras for each test point in each camera configuration mode; based on the number of visible cameras and a total number of cameras used for each camera configuration mode, calculating a configuration cost value for each camera configuration mode; and determining a final camera configuration mode based on the configuration cost value for each camera configuration mode. An effective way to properly configure the appropriate number of motion capture cameras is provided. The cost can be effectively saved while ensuring the effect of motion capture.

11 Claims, 6 Drawing Sheets

(58) Field of Classification Search
USPC .................................................. 348/211.3
See application file for complete search history.

(56) References Cited

FOREIGN PATENT DOCUMENTS

| | | |
|---|---|---|
| CN | 104469322 A | 3/2015 |
| CN | 105279331 A | 1/2016 |
| JP | 2006074260 A | 3/2006 |

\* cited by examiner

CAMERA CONFIGURATION METHOD AND APPARATUS

CROSS-REFERENCE TO RELATED APPLICATIONS

This application is a national phase entry under 35 U.S.C. § 371 of International Application No. PCT/CN2016/094125, filed on Aug. 9, 2016, the entire content of all of which is incorporated herein by reference.

FIELD OF THE DISCLOSURE

The present disclosure generally relates to the field of computer vision and, more particularly, relates to a method and apparatus for camera configuration.

BACKGROUND

Motion Capture (Mocap) technology involves dimension measurement, position and azimuth measurement of an object in a physical space, etc. By placing trackers at key points of the moving object, the positions of the trackers can be captured by the motion capture system, and the motion capture technology can be used in various fields, such as animation, gait analysis, biomechanics, and ergonomics. In principle, conventional motion capture technologies can be divided into the mechanical type, acoustic type, electromagnetic type, optical type, and so on.

The optical motion capture technology accomplishes the motion capture task by monitoring and tracking a specific optical spot on the target. Conventional optical motion capture technologies are mostly based on computer vision. In theory, for a point in space, as long as it can be seen from two cameras at the same time, the position of the point in space is determined by the images taken by the two cameras at the same time and camera parameters. When the cameras are shooting at a sufficiently high rate, the trajectory of the point can be obtained from the image sequences.

Because the range of activities of the target object being captured is large and there is no restriction from cables and mechanical devices, the optical motion capture system is widely used in various fields including film animation production, large-scale game production, and life science research field, etc. However, the drawback is that the system is expensive, especially the core device of the optical motion capture system, the motion capture camera, is very expensive. Therefore, it is important to reasonably configure an appropriate number of motion capture cameras while ensuring the effect of the motion capture in order to save the cost.

Currently, there seems no effective way to properly configure an appropriate number of motion capture cameras.

BRIEF SUMMARY OF THE DISCLOSURE

Various embodiments of the present disclosure provide a method and apparatus for camera configuration, so as to solve the lack of method to properly configure an appropriate number of motion capture cameras in the conventional technologies;

A first aspect of the present disclosure provides a camera configuration method, comprising:

in a preset view region, determining a preset number of camera configuration modes according to camera parameters set by a user, wherein the preset view region is a simulation region containing obstacles, and the camera parameters set by the user include a number of cameras, position information, and an angular range;

setting a preset number of test points in the preset view region;

calculating a number of visible cameras for each test point in each camera configuration mode, wherein the visible cameras are cameras that are capable of simultaneously capturing a same test point;

based on the number of visible cameras and a total number of cameras used for each camera configuration mode, calculating a configuration cost value for each camera configuration mode, wherein the configuration cost value is used to identify a desirability of the camera configuration mode; and determining a final camera configuration mode based on the configuration cost value for each camera configuration mode.

A second aspect of the present disclosure provides a camera configuration apparatus, comprising:

an initialization module, configured, in a preset view region, to determine a preset number of camera configuration modes according to camera parameters set by a user, wherein the preset view region is a simulation region containing obstacles, and the camera parameters set by the user include a number of cameras, position information, and an angular range;

a test point setting module, configured to set a preset number of test points in the preset view region;

a quantity calculation module, configured to calculate a number of visible cameras for each test point in each camera configuration mode, wherein the visible cameras are cameras that are capable of simultaneously capturing a same test point;

a cost evaluation module, configured, based on the number of visible cameras and a total number of cameras used for each camera configuration mode, to calculate a configuration cost value for each camera configuration mode, wherein the configuration cost value is used to identify a desirability of the camera configuration mode; and a selection module, configured to determine a final camera configuration mode based on the configuration cost value for each camera configuration mode.

Unlike the conventional motion capture technologies, the number of visible cameras for each test point is calculated for each camera configuration mode in the preset view region. According to the number of visible cameras for each test point and the total number of cameras used for each camera configuration mode, the configuration cost value for each camera configuration mode can then be calculated. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture.

DETAILED DESCRIPTION

In order to make the objectives, technical solutions, and advantages of the present disclosure to be more clearly understood, the following is a detailed description of embodiments of the present disclosure together with the accompanying drawings. It should be understood that the specific embodiments described herein are only used to explain the present disclosure and are not intended to limit the present disclosure.

The following is a detailed description of embodiments of the present disclosure together with the accompanying drawings.

The First Embodiment

Figure 1:
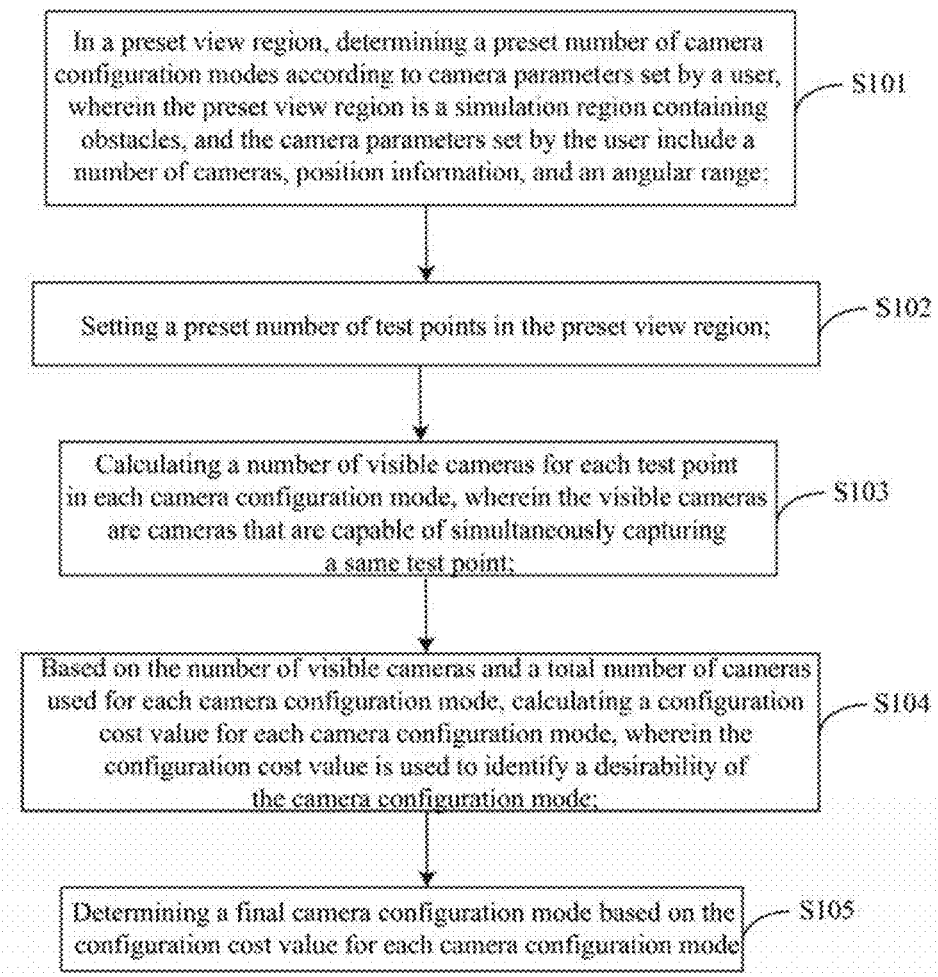
FIG. 1 is a flowchart of a camera configuration method according to a first embodiment of the present disclosure.

FIG. 1 is a flowchart of a camera configuration method according to a first embodiment of the present disclosure. The executing entity of the embodiment of the present disclosure may be a computer device or a functional unit in the computer device. The embodiment of the present disclosure specifically includes steps S101 to S105, as follows.

S101, in a preset view region, determining a preset number of camera configuration modes according to camera parameters set by a user, wherein the preset view region is a simulation region containing obstacles, and the camera parameters set by the user include a number of cameras, position information, and an angular range, etc.;

The preset view region may be a simulation region of any size and created by the user in an optical motion capture system, and the simulation region may include obstacles such as columns and walls. In the preset view region, the user can further set the camera parameters, including the number of cameras, position information, and the angular range, etc.

The camera configuration mode is determined by the camera parameters set by the user. Specifically, by providing the user with a parameter input window, such as a text box, the camera parameters set by user can be received. The camera parameters may include the number of cameras, position information, and the angular range, etc. The possible position and angle of the cameras can be calculated according to the camera parameters. The different calculation results are combined to determine the preset number of camera configuration modes. The preset number of camera configuration modes can be all possible combinations, or some combinations according to the application scenario, which, specifically, can be set according to the need of the actual application. There is no restriction on the preset number of camera configuration modes herein.

Further, because the view region is usually set as a shape of quadrangle or rectangle, the view region usually exhibits a symmetry feature. In this situation, the user only needs to set position information of one camera to generate position information of four or eight cameras, thereby reducing the input amount of camera parameters for the user and improving the efficiency of calculating the preset number of camera configuration modes.

Figure 2:
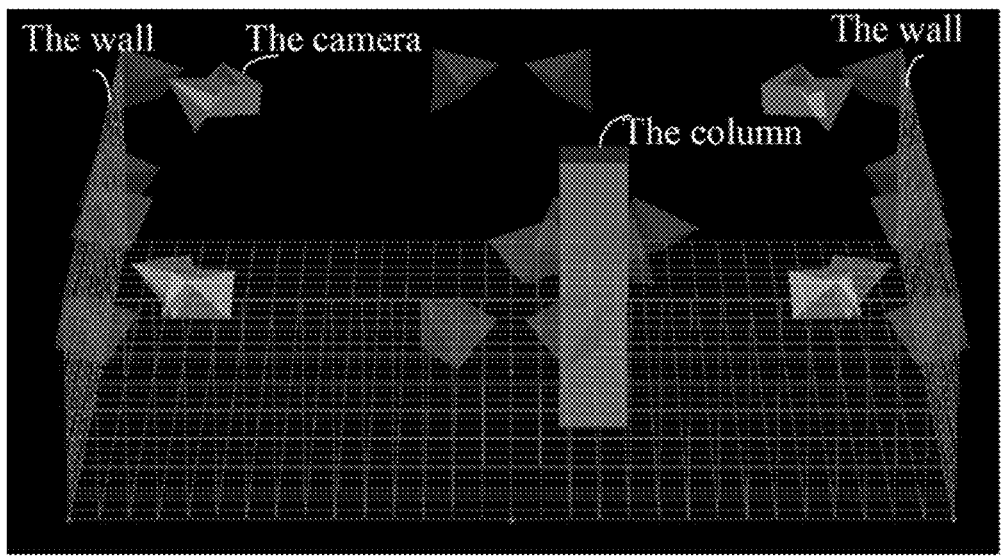
FIG. 2 is a schematic diagram of a camera configuration mode in a specific view region according to the first embodiment of the camera configuration method.

FIG. 2 is a schematic diagram of a camera configuration mode in a specific view region according to the first embodiment of a camera configuration method. A wall is configured on each side around the view region, and a column is provided in the middle of the view region. Pyramid shapes in the entire view region represent the cameras. It should be noted that, in order to facilitate observation, only the walls on the left and right sides are shown in FIG. 2, the walls on the front and rear sides are hidden.

S102, setting a preset number of test points in the preset view region.

The test points can be understood as markers. The markers are special markers or light-emitting points, and are affixed to the target object being captured. The optical motion capture system realizes the motion capture by recognizing the markers and processing the markers data.

Specifically, the preset number of test points may be set in the preset view region. The preset number can be customized according to the application requirements. The larger the preset number is set, the more test points are needed, the longer the test time is required, but the more accurate the test results are achieved.

S103, calculating a number of visible cameras for each test point in each camera configuration mode, wherein the visible cameras are cameras that are capable of simultaneously capturing a same test point.

Specifically, according to the preset number of camera configuration modes determined in step S101, in each camera configuration mode, determining the number of cameras that can capture the same test point, so as to determine the number of visible cameras of the test point.

For example, if the number of visible cameras for a certain test point is three, it means that the test point is within the view range of the three cameras and can be captured by the three cameras at the same time.

It should be noted that, when tracking a marker in a three-dimensional space, at least two cameras are required to capture this point at the same time; otherwise, the marker cannot be tracked. However, in practical applications, the target object being captured wearing the markers tends to move continuously or is easily blocked by obstacles, thus, it is not possible to ensure that the markers in a certain region can be steadily tracked with only two cameras capturing the certain region at the same time. Therefore, it is usually necessary to use two or more cameras capturing the same region at the same time. The tracking effect of the markers in a certain region is proportional to the number of cameras capturing the region at the same time. The more the cameras are used, the better the tracking effect of the markers is achieved, but also the cost is increased. Therefore, it is desired to properly configure the appropriate number of cameras to achieve the best tracking effect at the same time.

S104, based on the number of visible cameras for each test point and a total number of cameras used for each camera configuration mode, calculating a configuration cost value for each camera configuration mode, wherein the configuration cost value is used to identify advantages and disadvantages, or desirability of the camera configuration mode.

It should be noted that the camera parameters set by the user in step S101 include the number of cameras. Therefore, according to the preset number of camera configuration modes determined by the camera parameters set by the user, each camera configuration mode corresponds to a total number of cameras being used. It can be understood that the more the total number of cameras are used, the better the effect of motion capture is achieved, but also the cost is increased. Therefore, it is desired to properly select the total number of cameras to achieve the best motion capture effect at the same time.

Specifically, the configuration cost value is used to identify the advantages and disadvantages of the camera configuration mode. A configuration cost value of each camera configuration mode can be calculated based on the number of visible cameras for each test point (corresponding to a visible cost value) and the total number of cameras used in each camera configuration mode (corresponding to a total cost value). For example, according to the principle that the more the number of visible cameras are used for the test point, the lower the visible cost value is, and the more the total number of cameras are used, the higher the total cost value is, the visible cost value corresponding to each number of visible cameras and the total cost value corresponding to each total numbers of cameras can be set. For each camera configuration mode, the visible cost value for each test point is firstly calculated according to the number of visible cameras of each test point, and then the visible cost values for all test points are accumulated and added to the total cost values corresponding to the total number of cameras being used, so as to obtain the configuration cost value for the corresponding camera configuration mode.

S105, determining a final camera configuration mode based on the configuration cost value for each camera configuration mode.

Specifically, according to the configuration cost value of each camera configuration mode calculated in step S104, the final camera configuration mode is determined. Generally, the determination principle is that the lower the configuration cost value is, the better the corresponding camera configuration mode is.

It should be noted that, in other embodiments of the present disclosure, a preset range of configuration cost values may also be set. The camera configuration modes in which the configuration cost values belong to the preset range of configuration cost values may be obtained. The final camera configuration mode from the camera configuration mode in which the configuration cost values belong to the preset range of configuration cost values can be determined. When there are at least two camera configuration modes that have configuration cost values within the preset range of configuration cost values, either of the two camera configuration modes that meet the criteria can be chosen as the final camera configuration mode, or the one with the lower or lowest configuration cost value from the two camera configuration modes can be selected as the final camera configuration mode.

In the embodiment of the present disclosure, the number of visible cameras for each test point is calculated for each camera configuration mode in the preset view region. According to the number of visible cameras for each test point and the total number of cameras used for each camera configuration mode, the configuration cost value for each camera configuration mode can then be calculated. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture.

The Second Embodiment

Figure 3:
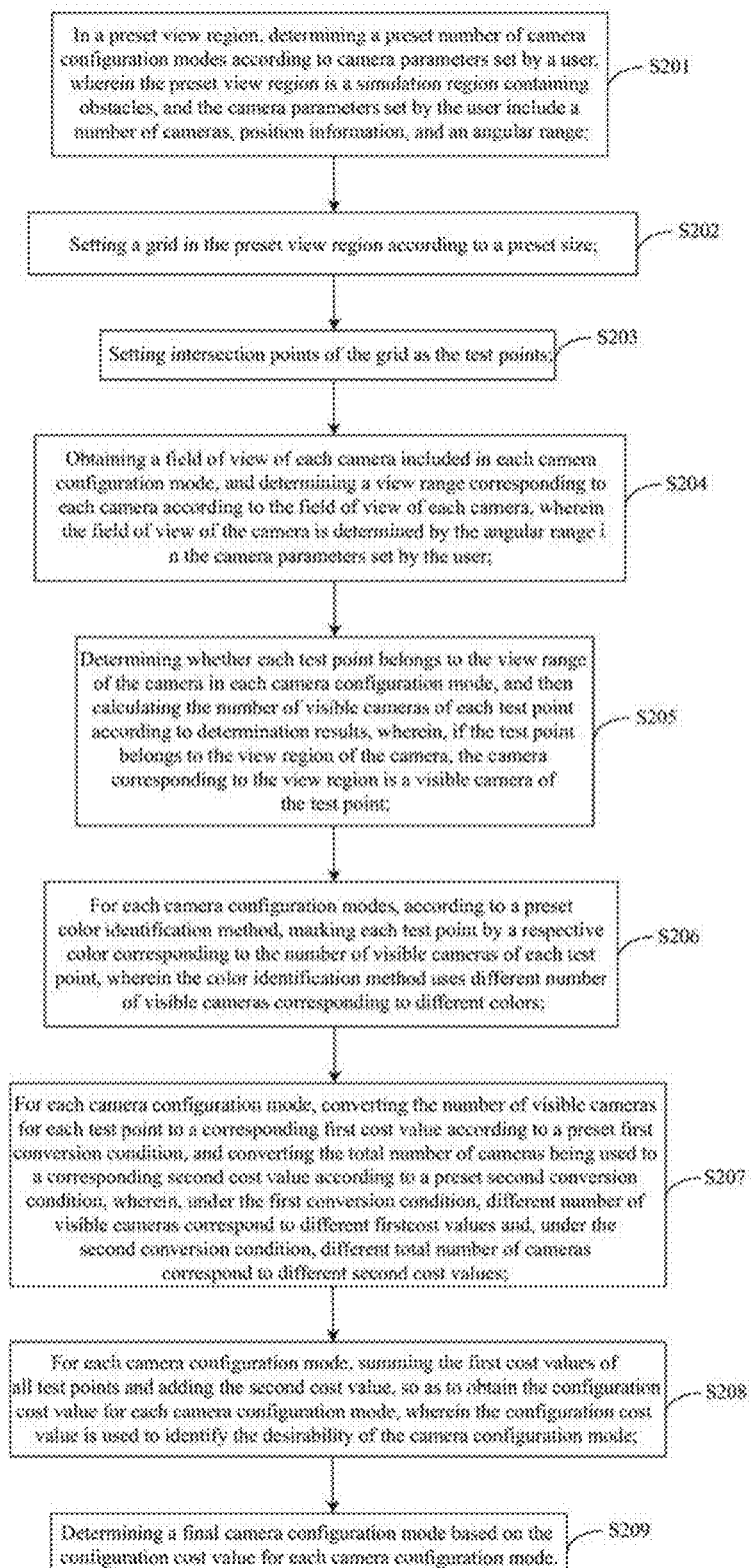
FIG. 3 is a flowchart of a camera configuration method according to a second embodiment of the present disclosure.

FIG. 3 is a flowchart of a camera configuration method according to a second embodiment of the present disclosure. The executing entity of the embodiment of the present disclosure may be a computer device or a functional unit in the computer device. The embodiment of the present disclosure specifically includes steps S201 to S209, as follows.

S201, in a preset view region, determining a preset number of camera configuration modes according to camera parameters set by a user, wherein the preset view region is a simulation region containing obstacles, and the camera parameters set by the user include a number of cameras, position information, and an angular range, etc.;

The preset view region may be a simulation region of any size and created by the user in an optical motion capture system, and the simulation region may include obstacles such as columns and walls. In the preset view region, the user can further set the camera parameters, including the number of cameras, position information, and the angular range, etc.

The camera configuration mode is determined by the camera parameters set by the user. Specifically, by providing the user with a parameter input window, such as a text box, the camera parameters set by user can be received. The camera parameters may include the number of cameras, position information, and the angular range, etc. The possible position and angle of the cameras can be calculated according to the camera parameters. The different calculation results are combined to determine the preset number of camera configuration modes.

The preset number of camera configuration modes can be all possible combinations, or some combinations according to the application scenario, which, specifically, can be set according to the need of the actual application. There is no restriction on the preset number of camera configuration modes herein.

Further, because the view region is usually set as a shape of quadrangle or rectangle, the view region usually exhibits a symmetry feature. In this situation, the user only needs to set position information of one camera to generate position information of four or eight cameras, thereby reducing the input amount of camera parameters for the user and improving the efficiency of calculating the preset number of camera configuration modes.

FIG. 2 is a schematic diagram of a camera configuration mode in a specific view region according to the first embodiment of a camera configuration method. A wall is configured on each side around the view region, and a column is provided in the middle of the view region. Pyramid shapes in the entire view region represent the cameras. It should be noted that, in order to facilitate observation, only the walls on the left and right sides are shown in FIG. 2, the walls on the front and rear sides are hidden.

S202, setting a grid in the preset view region according to a preset size.

In the preset view region, a sufficient number of test points can be obtained by drawing the grid (e.g., a square grid).

Specifically, the grid is set according to the preset size in the preset view region. The preset size can be customized according to the actual application. The larger the size is; the smaller the density of the grid is; the less the number of obtained test points are; the relatively larger error of the final camera configuration mode obtained from the test results of the test points is; but the shorter the calculation time is needed. To the contrary, the smaller the size is; the larger the density of the grids is; the more the obtained test points are; the relatively smaller error of the final camera configuration mode obtained from the test results of the test points is; but the longer the calculation time is needed.

S203, setting intersection points of the grid as the test points.

The test points can be understood as markers. The markers are special markers or light-emitting points, and are affixed to the target object being captured. The optical motion capture system realizes the motion capture by recognizing the markers and processing the markers data.

Specifically, the intersection points of the grid configured in step S202 are used as the test points.

S204, obtaining a field of view of each camera included in each camera configuration mode, and determining a view range corresponding to each camera according to the field of view of each camera, wherein the field of view of the camera is determined by the angular range in the camera parameters set by the user.

Figure 4:
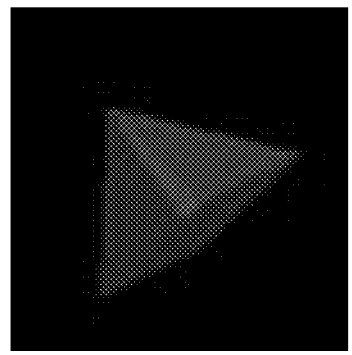
FIG. 4 is a schematic diagram of a camera and its view range according to the second embodiment of the camera configuration method.
Figure 5:
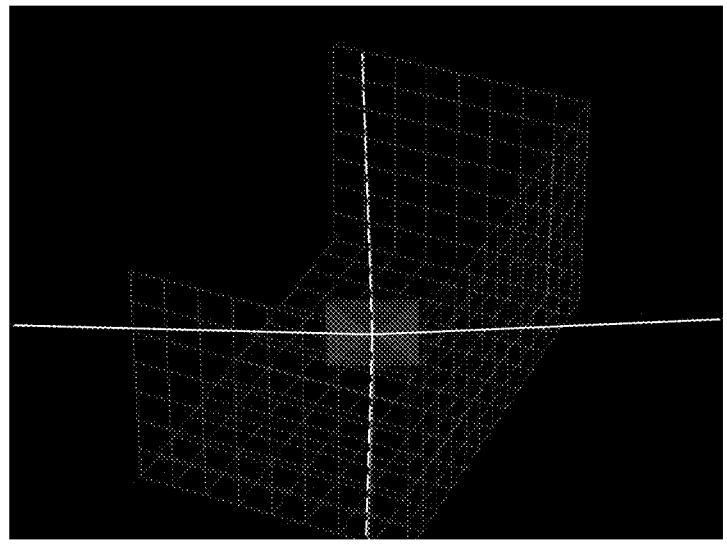
FIG. 5 is a schematic diagram of a specific camera and its view range observed from one view angle according to the second embodiment of the camera configuration method.

Specifically, according to each camera configuration mode determined by the camera parameters set by the user, the field of view of the camera is determined by the angular range in the camera parameters. The field of view of the camera includes a horizontal-axis field of view and a longitudinal-axis field of view. When the position and angle of the camera are fixed, accordingly, the horizontal-axis field of view and the longitudinal-axis field of view can be determined. The view range of the camera can be determined based on the field of view of the camera acquired. FIGS. 4 and 5 specified the field of view of the camera and the corresponding view range.

FIG. 4 shows a schematic diagram of a camera and its view range. As shown in FIG. 4, the view range of the camera can be seen as a pyramid-shaped region in which the camera is identified by the shape of the pyramid. The bottom of the pyramid can be regarded as a lens plane of the camera. The region extending from the top of the pyramid along the four sides of the pyramid is the view range of the camera.

FIG. 5 is a schematic diagram of a specific camera observed from one view angle and its view range. As shown in FIG. 5, in the preset view region, a current camera is identified by the pyramid shape, and an angle from the top of the pyramid along the left and right sides of the pyramid is the horizontal-axis field of view of the current camera, i.e., the angle between the two white solid lines in FIG. 5. An angle from the top of the pyramid along the upper and lower sides of the pyramid is the longitudinal-axis field of view of the current camera, i.e., the angle between the two white dotted lines in FIG. 5. The region formed by the horizontal-axis field of view and the longitudinal-axis field of view is the view range of the current camera.

S205, determining whether each test point belongs to the view range of the camera in each camera configuration mode, and then calculating the number of visible cameras of each test point according to determination results, wherein, if the test point belongs to the view region of the camera, the camera corresponding to the view region is a visible camera of the test point.

Figure 6:
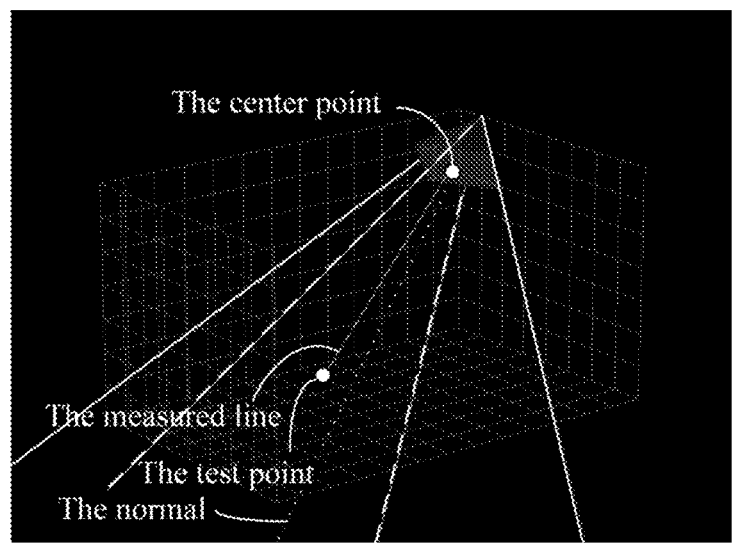
FIG. 6 is a schematic diagram of a specific camera and its view range observed from another view angle according to the second embodiment of the camera configuration method.

FIG. 6 is a schematic diagram of a current camera observed from a view angle after 180 degrees of rotation of the view region of FIG 5 and its view range. In FIG. 6, a normal is the dotted line perpendicular to the camera lens plane, and a measured line is the connection between the test point and the center point.

Specifically, determining whether each test point belongs to the view range of the camera in each camera configuration mode can be achieved through the following process. The detailed description is as follows.

For each test point in each camera configuration mode, traverse all cameras included in the camera configuration mode, and determine whether the test point meets the following visual criteria a1) to a5) for each camera:

a1) in a user coordinate system established by using the current camera as a reference, a third-dimension coordinate value of the test point is negative.

Referring to FIG. 6, in the user coordinate system established by using the current camera as the reference, the positive direction of the third-dimension coordinate is the positive direction of the normal of the lens plane of the current camera. If the third-dimension coordinate value of the test point is negative, it is determined that the test point is not within the view range of the current camera.

a2) a distance between the test point and the center point of the lens plane of the current camera is greater than a preset distance threshold.

Referring to FIG. 6, if the distance between the test point and the center point is greater than the preset distance threshold, it is determined that the test point is not within the view range of the current camera.

The distance threshold can be customized according to the needs of the actual application and the performance of the camera.

a3) a horizontal angle between the measured line and the normal of the lens plane of the current camera is greater than one half of the horizontal-axis field of view of the view range of the current camera, where the measured line is the connection of the test point to the center point of the lens plane of the current camera.

Referring to FIG. 6, through a vector resolution of the angle between the measured line and the normal line, the horizontal angle and the longitudinal angle between the measured line and the normal line can be obtained. If the horizontal angle between the measured line and the normal is greater than one-half of the horizontal-axis field of view, it is determined that the test point is not within the view range of the current camera.

a4) a longitudinal angle between the measured line and the normal of the lens plane of the current camera is greater than one-half of the longitudinal-axis field of view of the view range of the current camera.

Referring to FIG. 6, if the longitudinal angle between the measured line and the normal is greater than one-half of the longitudinal-axis field of view, it is determined that the test point is not within the view range of the current camera.

a5) a position of the obstacle in the view region belongs to the line segment formed between the test point and the center point of the lens plane of the current camera.

Because a user-set obstacle is in the view region, if the position of the obstacle is exactly on the line segment formed between the test point and the center point in FIG. 6, it is determined that the test point is not within the view range of the current camera.

According to the above criteria on the visual conditions a1) to a5), if the test point satisfies any of the above visual conditions a1) to a5), it is determined that the test point is not within the view range of the current camera, i.e., cannot be captured by the current camera. If the test point does not satisfy any of the above visual conditions a1) to a5), it is determined that the test point is within the view range of the current camera, i.e., can be captured by the current camera, and the current camera is recognized as the visible camera corresponding to the test point.

Based on the determination results mentioned-above, the number of visible cameras for each test point is obtained by traversing all the test points in each camera configuration mode.

For example, if the number of visible cameras for a certain test point is three, it means that the test point is within the view range of the three cameras and can be captured by the three cameras at the same time.

S206, for each camera configuration modes, according to a preset color identification method, marking each test point by a respective color corresponding to the number of visible cameras of each test point, wherein the color identification method uses different number of visible cameras corresponding to different colors.

In order to enable the user to more intuitively understand the result of the calculation of step S205, the number of visible cameras of the test point can be visualized by the color identification method.

Specifically, the color identification method may be the different number of visible cameras corresponding to different colors. That is, the different numbers of visible cameras are represented by different colors. For example, red represents that the number of visible cameras for the test point is zero, yellow represents that the number of visible cameras for the test point is one, green indicates that the number of visible cameras for the test point is two, blue indicates that the number of visible cameras for the test point is three, and white indicates that the number of visible cameras for the test point is any number greater than or equal to four.

Specifically, for each camera configuration mode, according to the preset color identification method, a corresponding color is selected for each number of visible cameras. According to the results calculated in step S205, each of the test points is marked by the respective color corresponding to the number of visible cameras of each test point. For example, if the test point is marked as red, it means that the test point cannot be taken by any camera. If the test point is marked as blue, then the test point can be captured by three cameras at the same time.

With this color identification method, the user can visually understand the pros and cons of the current camera configuration mode by looking at the distribution of the colors in the view region.

S207, for each camera configuration mode, converting the number of visible cameras for each test point to a corresponding first cost value according to a preset first conversion condition, and converting the total number of cameras being used to a corresponding second cost value according to a preset second conversion condition, wherein, under the first conversion condition, different number of visible cameras correspond to different first cost values and, under the second conversion condition, different total number of cameras correspond to different second cost values.

The preset first conversion condition may be different number of visible cameras corresponding to different first cost values. That is, different first cost values corresponding to the different number of visible cameras. Specific configuration of the relationship between the number of visible cameras and the first cost value can be customized according to the needs of the actual application.

For example, the first cost value of the test point with zero visible cameras may be set as 10000. Because if the number of visible cameras for the test point is zero, it means that the test point cannot be seen by any camera in the view region, thus, a higher first cost value may be set to indicate that the camera configuration corresponding to this situation is not desirable. The first cost values of the test points with one visible camera can be set as 100; the first cost values of the test points with two visible cameras can be set as 10; the first cost values of the test points with three visible cameras can be set as 1.

The preset second conversion condition may be different total number of cameras corresponding to different second cost values. That is, different second cost values corresponding to different total number of cameras. Specific configuration of the relationship between the total number of cameras and the second cost value can be customized according to the needs of the actual application.

For example, in the camera parameters set by the user in step S201, the total number of cameras is in the range of 20 to 25. The higher total number of cameras represents the higher cost of the corresponding camera configuration mode; therefore, a higher second cost value may be set. The second cost value of the camera configuration mode using 20 cameras can be set as a; the second cost value of the camera configuration mode using 21 cameras can be set as b; the second cost value of the camera configuration mode using 22 cameras can be set as c; the second cost value of the camera configuration mode using 23 cameras can be set as d; the second cost value of the camera configuration mode using 24 cameras can be set as e; the second cost value of the camera configuration mode using 25 cameras can be set as f; where the specific values of a, b, c, d, e, and f can be set according to the actual application, and are satisfied $0<a<b<c<d<e<f$.

S208, for each camera configuration mode, summing the first cost values of all test points and adding the second cost value, so as to obtain the configuration cost value for each camera configuration mode, wherein the configuration cost value is used to identify the desirability of the camera configuration mode.

Specifically, in each camera configuration mode, the first cost value of each test points can be obtained according to step S207, the first cost values of all the test points are summed and added to the second cost value to obtain the configuration cost value of each camera configuration mode, where the configuration cost value is used to identify the advantages and disadvantages of the camera configuration mode.

The specific algorithm for adding the first and second cost values can be customized according to the needs of the specific application. For example, the sum of the first cost values of all the test points can be added to the second cost values in proportion.

S209, a final camera configuration mode is determined according to the configuration cost value for each camera configuration mode.

Specifically, the final camera configuration mode is further determined according to the configuration cost value of each camera configuration mode obtained in step S208.

For example, according to the conversion conditions for the first cost value and the second cost value enumerated in step S207, the configuration cost value of each camera configuration mode is calculated in accordance with step S208. It can be understood that the minimum configuration cost value of the corresponding camera configuration mode is the optimal one. That is, the final camera configuration mode can be the camera configuration corresponding to the minimum configuration cost value.

It should be noted that, in the present embodiment, step S206 and step S207 may be performed in parallel.

In the present embodiment, firstly, the number of visible cameras for each test point is calculated for each camera configuration mode in the preset view region. According to a preset first conversion condition, convert the number of visible cameras for each test point to a corresponding first cost value, and according to a preset second conversion condition, convert the total number of cameras being used to a corresponding second cost value. Then, the first cost values of all the test points are summed and added to the second cost value to obtain the configuration cost value of each camera configuration mode. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture. Secondly, in each camera configuration mode, according to a preset color identification method, each test point is marked by the respective color corresponding to the number of visible cameras of each test point. The user can visually understand the advantages and disadvantages of the current camera configuration by looking at the distribution of the colors in the view region. The visualization of the camera configuration is enhanced. Thirdly, a grid in the preset view region is set according to a preset size. Intersection points of the grid are set as test points. A flexible set of test points is achieved by effectively adjusting the density of the test points, and the best test results can be achieved.

The Third Embodiment

Figure 7:
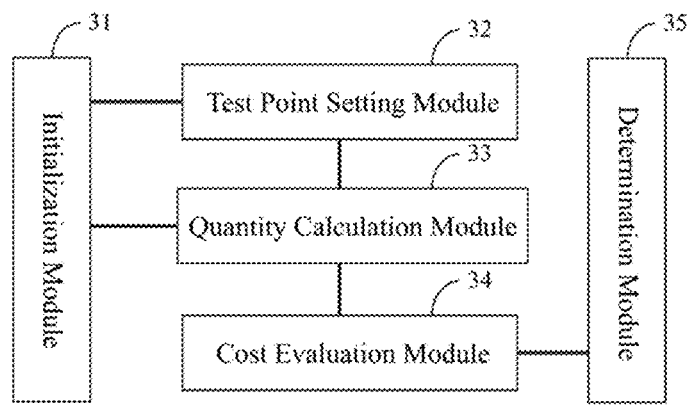
FIG. 7 is a schematic diagram of a camera configuration apparatus according to a third embodiment of the present disclosure.

FIG. 7 is a schematic diagram of a camera configuration apparatus according to a third embodiment of the present disclosure. Only portions related to the embodiments of the present disclosure are shown for the convenience of explanation. A camera configuration apparatus according to the embodiment in FIG. 7 may be the executing entity of the camera configuration method provided in the first embodiment, which may be a computer apparatus or a functional unit in a computer apparatus. A camera configuration apparatus according to the embodiment in FIG. 7 includes an initialization module 31, a test point setting module 32, a quantity calculation module 33, a cost calculation module 34, and a selection module 35. The functional units are described in detail as follows.

The initialization module 31 is configured, in a preset view region, to determine a preset number of camera configuration modes according to camera parameters set by a user, wherein the preset view region is a simulation region containing obstacles, and the camera parameters set by the user include a number of cameras, position information, and an angular range.

The test point setting module 32 is configured to set a preset number of test points in the preset view region.

The quantity calculation module 33 is configured to calculate a number of visible cameras for each test point in each camera configuration mode, wherein the visible cameras are cameras that are capable of simultaneously capturing a same test point.

The cost evaluation module 34 is configured, based on the number of visible cameras for each test point and a total number of cameras used for each camera configuration mode, to calculate a configuration cost value for each camera configuration mode, wherein the configuration cost value is used to identify a desirability of the camera configuration mode.

The selection module 35 is configured to determine a final camera configuration mode based on the configuration cost value for each camera configuration mode.

The present embodiment provides a process for realizing the respective function of each unit in one camera configuration apparatus, and reference may be made to the description of the embodiment in FIG. 1, which is not specifically described herein.

Referring to the embodiment of a camera configuration apparatus in FIG. 7, in the present embodiment, the number of visible cameras for each test point is calculated for each camera configuration mode in the preset view region. According to the number of visible cameras for each test point and the total number of cameras used for each camera configuration mode, the configuration cost value for each camera configuration mode can then be calculated. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture.

The Fourth Embodiment

Figure 8:
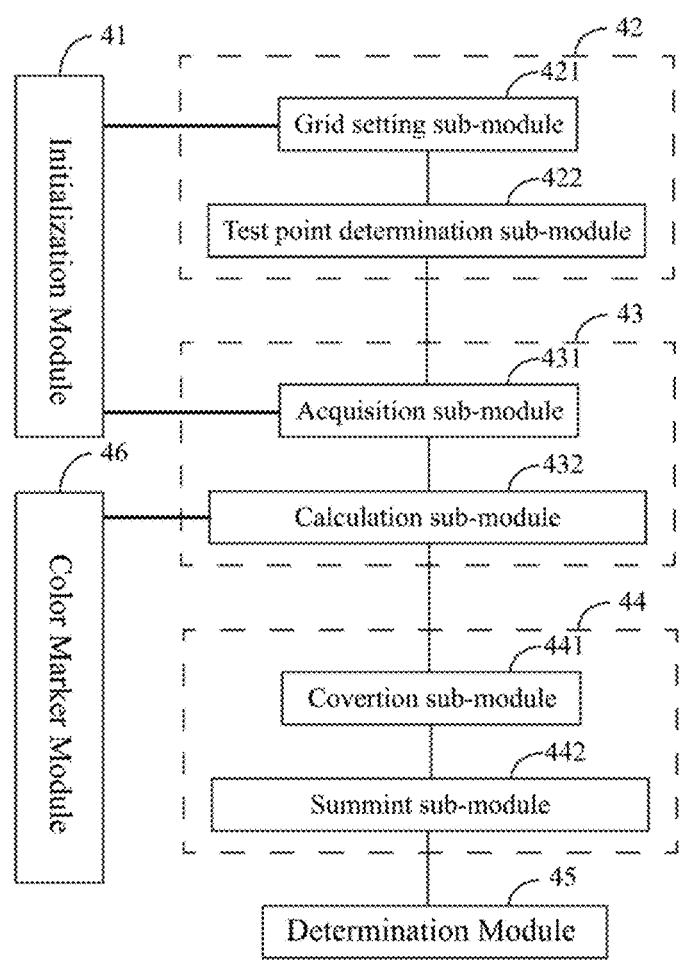
FIG. 8 is a schematic diagram of a camera configuration apparatus according to a fourth embodiment of the present disclosure.

FIG. 8 is a schematic diagram of a camera configuration apparatus according to a fourth embodiment of the present disclosure. Only portions related to the embodiments of the present invention are shown for the convenience of explanation. A camera configuration apparatus according to the embodiment in FIG. 8 may be the executing entity of the camera configuration method provided in the second embodiment, which may be a computer apparatus or a functional unit in a computer apparatus. A camera configuration apparatus according to the embodiment in FIG. 8 includes an initialization module 41, a test point setting module 42, a quantity calculation module 43, a cost calculation module 44, and a selection module 45. The functional units are described in detail as follows:

The initialization module 41 is configured, in a preset view region, to determine a preset number of camera configuration modes according to camera parameters set by a user, wherein the preset view region is a simulation region containing obstacles, and the camera parameters set by the user include a number of cameras, position information, and an angular range. The test point setting module 32 is configured to set a preset number of test points in the preset view region.

The test point setting module 42 is configured to set a preset number of test points in the preset view region.

The quantity calculation module 43 is configured to calculate a number of visible cameras for each test point in each camera configuration mode, wherein the visible cameras are cameras that are capable of simultaneously capturing a same test point.

The cost evaluation module 44 is configured, based on the number of visible cameras for each test point and a total number of cameras used for each camera configuration mode, to calculate a configuration cost value for each camera configuration mode, wherein the configuration cost value is used to identify a desirability of the camera configuration mode.

The selection module 45 is configured to determine a final camera configuration mode based on the configuration cost value for each camera configuration mode.

The quantity calculation module 43 further includes:
- an acquisition sub-module 431, configured to obtain a field of view of each camera included in each camera configuration mode, and to determine a view range corresponding to each camera according to the field of view of each camera, wherein the field of view of the camera is determined by the angular range in the camera parameters set by the user; and
- a calculation sub-module 432, configured to determine whether each test point belongs to the view range of the camera in each camera configuration mode, and then to calculate the number of visible cameras of each test point according to determination results, wherein, if the test point belongs to the view region of the camera, the camera corresponding to the view region is a visible camera of the test point.

The cost evaluation module 44 further includes:
- a conversion sub-module 441, configured, for each camera configuration mode, to convert the number of visible cameras for each test point to a corresponding first cost value according to a preset first conversion condition, and to convert the total number of cameras being used to a corresponding second cost value according to a preset second conversion condition, wherein, under the first conversion condition, different number of visible cameras correspond to different first cost values and, under the second conversion condition, different total number of cameras correspond to different second cost values; and
- a summing sub-module 442, configured, for each camera configuration mode, to sum the first cost values of all test points and to add the second cost value, so as to obtain the configuration cost value for each camera configuration mode, wherein the configuration cost value is used to identify the desirability of the camera configuration mode.

The camera configuration apparatus further includes:
- a color marker module 46, configured, for each camera configuration modes, according to a preset color identification method, to mark each test point by a respective color corresponding to the number of visible cameras of each test point, wherein the color identification method uses different number of visible cameras corresponding to different colors.

The test point setting module 42 further includes:
- a grid setting sub-module, configured to set a grid in the preset view region according to a preset size; and
- a test point determination sub-module, configured to set intersection points of the grid as the test points.

The present embodiment provides a process for realizing the respective function of each unit in one camera configuration apparatus, and reference may be made to the description of the embodiment in FIG. 3, which is not specifically described herein.

Referring to the embodiment of a camera configuration apparatus in FIG. 8, firstly, the number of visible cameras for each test point is calculated for each camera configuration mode in the preset view region. According to a preset first conversion condition, convert the number of visible cameras for each test point to a corresponding first cost value, and according to a preset second conversion condition, convert the total number of cameras being used to a corresponding second cost value. Then, the first cost values of all the test points are summed and added to the second cost value to obtain the configuration cost value of each camera configuration mode. The final camera configuration mode can be determined based on the configuration cost values. Accordingly, an effective way to properly configure the appropriate number of motion capture cameras is provided, taking into account both the number of visible cameras and the total number of cameras being used, as well as their effect on mutual restraint between the effect of motion capture and the cost. The cost can be effectively saved while ensuring the effect of motion capture. Secondly, in each camera configuration mode, according to a preset color identification method, each test point is marked by the respective color corresponding to the number of visible cameras of each test point. The user can visually understand the advantages and disadvantages of the current camera configuration by looking at the distribution of the colors in the view region. The visualization of the camera configuration is enhanced. Thirdly, a grid in the preset view region is set according to a preset size. Intersection points of the grid are set as test points. A flexible set of test points is achieved by effectively adjusting the density of the test points, and the best test results can be achieved.

The Fifth Embodiment

Figure 9:
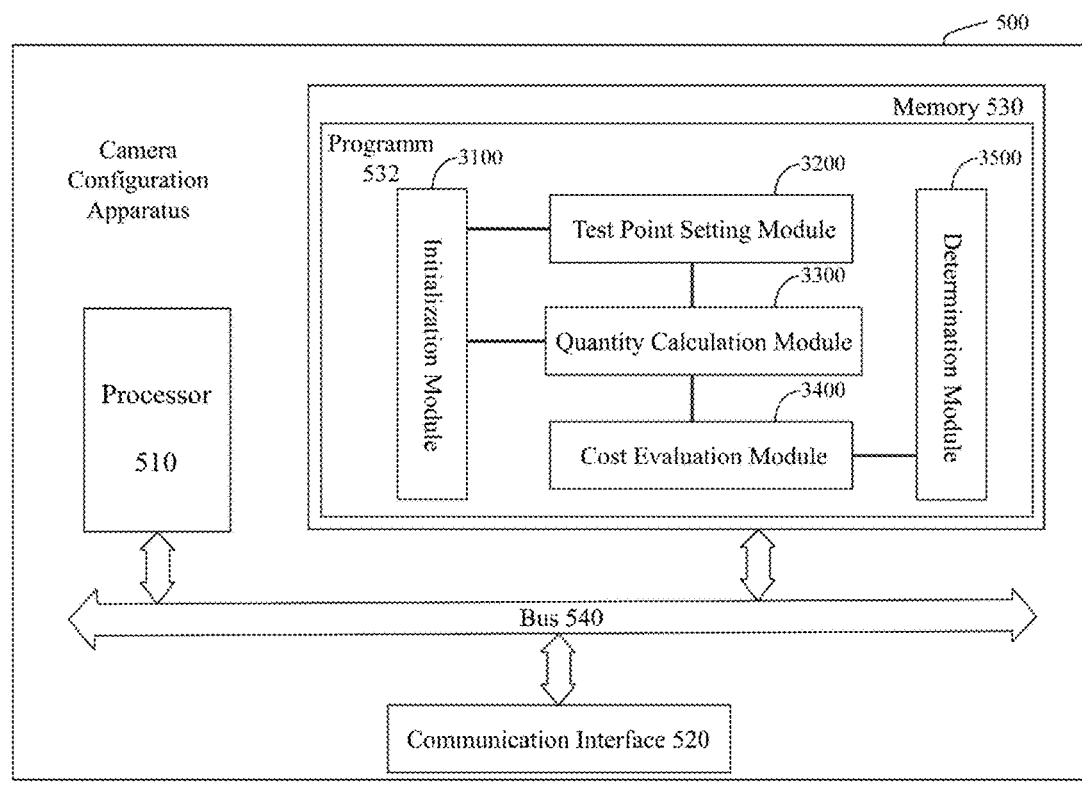
FIG. 9 is a schematic diagram of a camera configuration apparatus according to a fifth embodiment of the present disclosure.

Referring to FIG. 9, the embodiment of the present disclosure provides a schematic diagram of a camera configuration apparatus 500. The camera configuration apparatus 500 may be a computer apparatus or a functional unit in a computer apparatus, and the specific embodiment of the disclosure does not define the specific implementation of the camera configuration apparatus. The camera configuration apparatus 500 includes: a processor 510, a communication interface 520, a memory 530, and a bus 540.

The processor 510, the communication interface 520, and the memory 530 communicate with each other through the bus 540.

The communication interface 520 is configured to communicate with an external device, such as a personal computer, a server, or the like.

The processor 510 is configured to execute a program 532.

In particular, the program 532 may include program code. The program code includes computer operation instructions.

The processor 510 may be a central processing unit CPU, either an Application Specific Integrated Circuit (ASIC) or one or more integrated circuits configured to implement embodiments of the present disclosure.

The memory 530 is configured to store the program 532. The memory 530 may contain high-speed RAM memory, and may also include non-volatile memory, such as at least one disk memory. The program 532 may include:
- an initialization module 3100 configured, in a preset view region, to determine a preset number of camera configuration modes according to camera parameters set by a user, wherein the preset view region is a simulation region containing obstacles, and the camera parameters set by the user include a number of cameras, position information, and an angular range;
- a test point setting module 3200 configured to set a preset number of test points in the preset view region;
- a quantity calculation module 3300 configured to calculate a number of visible cameras for each test point in each camera configuration mode, wherein the visible cameras are cameras that are capable of simultaneously capturing a same test point;
- a cost evaluation module 3400 configured, based on the number of visible cameras for each test point and a total number of cameras used for each camera configuration mode, to calculate a configuration cost value for each camera configuration mode, wherein the configuration cost value is used to identify a desirability of the camera configuration mode.

a selection module 3500 configured to determine a final camera configuration mode based on the configuration cost value for each camera configuration mode.

The specific implementation of each unit in the program 532 can be referred to the corresponding unit in the embodiment shown in FIG. 7 and will not be described herein.

It will be apparent to a person skilled in the art that the specific processes of the apparatus and units described-above may be referred to the corresponding processes in the foregoing embodiments of the method and will not be described further herein for the convenience and simplicity of the description.

In several embodiments provided herein, it should be understood that the disclosed systems, apparatus, and methods may be implemented in other ways. For example, the embodiment of the apparatus described-above is merely illustrative. For example, the division of the units is only a logical function division, and there may be additional ways of actually implementing. For example, multiple units or components may be combined or can be integrated into another system, or some feature can be ignored, or not executed. In other respects, the mutual coupling or direct coupling or communication connection shown or discussed may be either an indirect coupling via some communication interfaces, apparatus, or units, or a communication connection, and may be electrical type, mechanical type, or other types.

The units described as the separate parts may or may not be physically separate, and the components shown as units may or may not be physical units, i.e., may be located in one place or may be distributed over a plurality of network elements. The part or all of the units may be selected according to the actual needs to achieve the objective of the present embodiment.

In addition, the functional units in various embodiments of the present disclosure may be integrated into one processing unit or each unit may be physically present, or two or more units may be integrated into one unit.

If functions are implemented in the form of a software functional unit, and sold or used as a separate product, the functions may be stored in a computer-readable storage medium. Based on this understanding, the technical solution of the present disclosure, in essence, or in the form of a prior art, can be embodied in the form of a software product, the software product stored in a storage medium, includes a number of instructions for enabling a computer device (which may be a mobile phone, a computer, a server, or a network device, etc.) to perform all or part of the method described in the various embodiments of the present disclosure. The aforementioned storage medium includes various mediums that can store instructions, such as a USB disk, a mobile hard disk, a Read-Only Memory (ROM), a Random Access Memory, a magnetic disk, or an optical disk, and the like.

The embodiments disclosed herein are exemplary only. Other applications, advantages, alternations, modifications, or equivalents to the disclosed embodiments are obvious to a person skilled in the art and are intended to be encompassed within the scope of the present disclosure.

What is claimed is:

1. A camera configuration method, comprising:
in a preset view region, determining a preset number of camera configuration modes according to camera parameters set by a user, wherein the preset view region is a simulation region containing obstacles, and the camera parameters set by the user include a number of cameras, position information, and an angular range;
setting a preset number of test points in the preset view region;
calculating a number of visible cameras for each test point in each camera configuration mode, wherein the visible cameras are cameras that are capable of simultaneously capturing a same test point;
based on the number of visible cameras and a total number of cameras used for each camera configuration mode, calculating a configuration cost value for each camera configuration mode, wherein the configuration cost value is used to identify a desirability of the camera configuration mode; and
determining a final camera configuration mode based on the configuration cost value for each camera configuration mode.

2. The camera configuration method according to claim 1, wherein calculating the number of the visible cameras for each test point in each camera configuration further comprises:
obtaining a field of view of each camera included in each camera configuration mode, and determining a view range corresponding to each camera according to the field of view of each camera, wherein the field of view of the camera is determined by the angular range in the camera parameters set by the user; and
determining whether each test point belongs to the view range of the camera in each camera configuration mode, and then calculating the number of visible cameras of each test point according to determination results, wherein, if the test point belongs to the view region of the camera, the camera corresponding to the view region is a visible camera of the test point.

3. The camera configuration method according to claim 2, wherein obtaining the field of view of each camera includes:
obtaining a horizontal-axis field of view and a longitudinal-axis field of view.

4. The camera configuration method according to claim 2, wherein determining the view range corresponding to each camera according to the field of view of each camera includes:
determining the view range of each camera as a region formed by the horizontal-axis field of view and the longitudinal-axis field of view.

5. The camera configuration method according to claim 2, wherein according to the number of visible cameras and a total number of cameras used for each camera configuration mode, calculating the configuration cost value for each camera configuration mode, further comprises:
for each camera configuration mode, converting the number of visible cameras for each test point to a corresponding first cost value according to a preset first conversion condition, and converting the total number of cameras being used to a corresponding second cost value according to a preset second conversion condition, wherein, under the first conversion condition, different number of visible cameras correspond to different first cost values and, under the second conversion condition, different total number of cameras correspond to different second cost values; and
for each camera configuration mode, summing the first cost values of all test points and adding the second cost value, so as to obtain the configuration cost value for each camera configuration mode, wherein the configuration cost value is used to identify the desirability of the camera configuration mode.

6. The camera configuration method according to claim 2, after calculating the number of the visible cameras for each test point in each camera configuration mode, further comprising:

for each camera configuration modes, according to a preset color identification method, marking each test point by a respective color corresponding to the number of visible cameras of each test point, wherein the color identification method uses different number of visible cameras corresponding to different colors.

7. The camera configuration method according to claim 2, wherein setting the preset numbers of test points in the preset view region further comprises:

setting a grid in the preset view region according to a preset size; and setting intersection points of the grid as the test points.

8. The camera configuration method according to claim 1, wherein according to the number of visible cameras and a total number of cameras used for each camera configuration mode, calculating the configuration cost value for each camera configuration mode, further comprises:

for each camera configuration mode, converting the number of visible cameras for each test point to a corresponding first cost value according to a preset first conversion condition, and converting the total number of cameras being used to a corresponding second cost value according to a preset second conversion condition, wherein, under the first conversion condition, different number of visible cameras correspond to different first cost values and, under the second conversion condition, different total number of cameras correspond to different second cost values; and for each camera configuration mode, summing the first cost values of all test points and adding the second cost value, so as to obtain the configuration cost value for each camera configuration mode, wherein the configuration cost value is used to identify the desirability of the camera configuration mode.

9. The camera configuration method according to claim 1, after calculating the number of the visible cameras for each test point in each camera configuration mode, further comprising:

for each camera configuration modes, according to a preset color identification method, marking each test point by a respective color corresponding to the number of visible cameras of each test point, wherein the color identification method uses different number of visible cameras corresponding to different colors.

10. The camera configuration method according to claim 1, wherein setting the preset numbers of test points in the preset view region further comprises:

setting a grid in the preset view region according to a preset size; and setting intersection points of the grid as the test points.

11. The camera configuration method according to claim 1, wherein determining the final camera configuration mode based on the configuration cost value for each camera configuration mode includes:

determining the final camera configuration mode as the camera configuration corresponding to the minimum configuration cost value.

\* \* \* \* \*